G. H. BARKER.
KITCHEN SINK UTENSIL.
APPLICATION FILED DEC. 12, 1912.
1,116,543.
Patented Nov. 10, 1914.
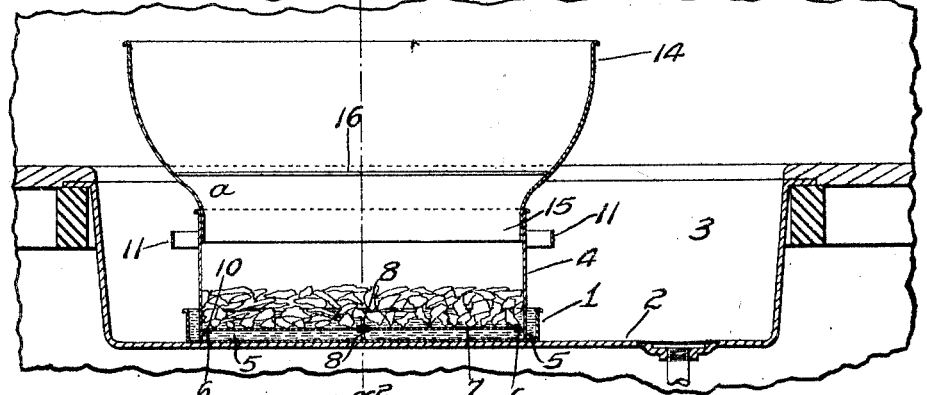
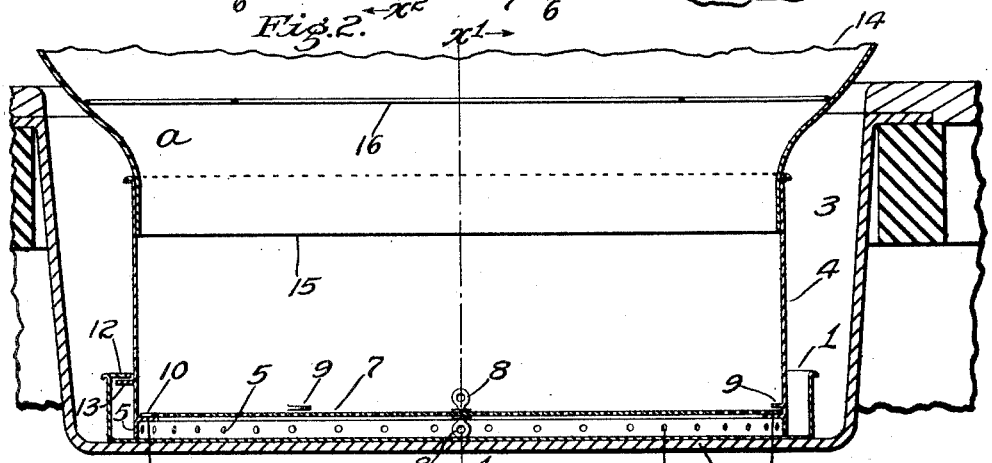
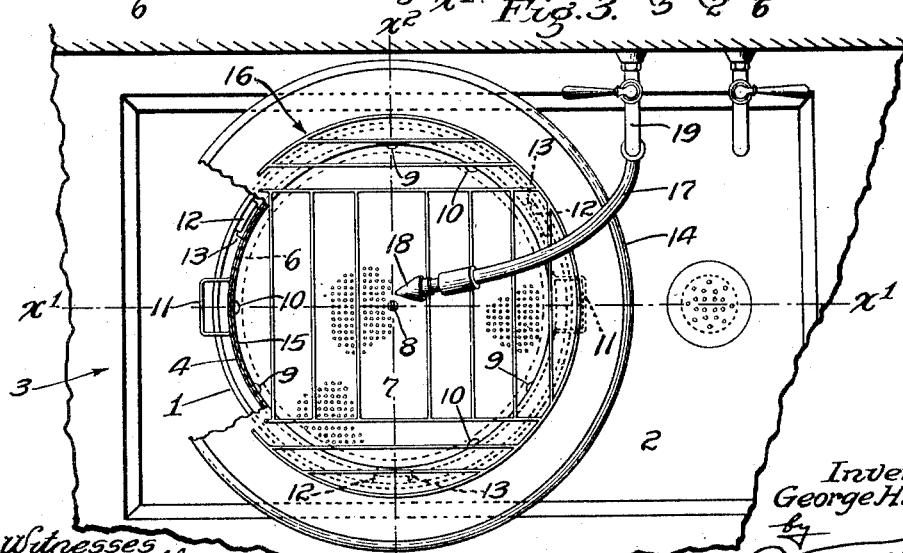
Inventor:
George H. Barker
by James R. Townsend
his atty
Witnesses
H. W. Kirby
L. Belle Rice

UNITED STATES PATENT OFFICE.

GEORGE H. BARKER, OF PASADENA, CALIFORNIA.

KITCHEN-SINK UTENSIL.

1,116,543.  Specification of Letters Patent.  Patented Nov. 10, 1914.

Application filed December 12, 1912. Serial No. 736,416.

*To all whom it may concern:*

Be it known that I, GEORGE H. BARKER, a citizen of the United States, residing at Pasadena, in the county of Los Angeles and State of California, have invented a new and useful Kitchen-Sink Utensil, of which the following is a specification.

An object of this invention is to provide a utensil by means of which the labor of the housewife, cook or kitchen attendant, may be greatly lightened and much of its disagreeable character eliminated, and by which the work of washing dishes and immediately disposing of the refuse and the garbage thereon may be easily effected at a single operation and its final disposal greatly facilitated, and whereby the liability of clogging the waste pipes of sinks with grease and waste washed from the dishes may be done away with.

The invention as a whole constitutes a combined portable dish cleaner, garbage receptacle and grease trap, constructed of separable parts, and adapted to be set in a sink to serve the purposes hereinafter set forth and instantly removed therefrom when it is desired to leave the sink free. It also comprises the several parts and combination of parts described in the subjoined detail description and claimed in the appended claims.

The accompanying drawings illustrate the invention.

Figure 1 is a sectional elevation on line $x^1$, Figs. 2 and 3, of the utensil seated in a sink as it may appear in use with garbage therein and water that has flowed through and drained from such garbage. Fig. 2 is an enlarged cross-sectional detail of the appliance shown in Fig. 1, and viewed from line $x^2$, Figs. 1 and 3. Fig. 3 is a fragmental plan of the apparatus shown in Figs. 1 and 2.

The pan 1 is open at the top and is adapted to be seated on the floor 2 of an ordinary sink 3. It is water tight and has a depth of from one to two inches, more or less, so as to form a grease trapping receptacle in which is seated the garbage receptacle which comprises an open-ended cylindrical wall 4 provided near the bottom with an outlet which may be in the form of perforations 5 and above said perforations with a ledge 6 to support a removable and reversible garbage receptacle and grease remover comprising a perforated bottom 7 that is provided with central lugs 8 projecting from opposite sides of the removable bottom, the lower lug serving as a support for the center of the garbage receptacle bottom; and the upper lug serving as a handle by which the garbage receptacle bottom may be removed for cleaning. Retaining lugs 9 projecting from the inside of the wall 4 serve to hold the removable bottom 7 in said wall when the same is inverted, and notches 10 in the edge of the bottom 7 allow said bottom to pass the lugs and to be removed when properly turned for that purpose.

The wall 4 is provided with handles 11 by which it may be lifted to carry out the refuse and garbage. Suitable retainers are provided between the pan 1 and the garbage receptacle wall 4, as the projections 12 extending inwardly from the rim of the pan, and projections 13 extending out from the wall 4, so that by turning the wall 4 inside the pan, the retainers and consequently the wall and pan may be engaged and disengaged at pleasure so as to be moved together or separately.

The upper end of the utensil is constructed as a dish rack comprising an open-ended flaring shell 14 terminating in a cylindrical lower end 15 that fits inside the cylindrical garbage receptacle wall 4 and that is supported by said wall; there being inside said shell, a grid 16 which may be variously constructed of wire, rods, or other suitable devices, to support dishes that are placed therein. However, the shell 14 of the rack or dish support is contracted below its top so as to uphold plates and other dishes of considerable diameter which may be inserted edge downward into the rack in case the grid is removed, and will then rest on the contracted ledge $a$ of the rack; the purpose of the grid being simply to support on edge, dishes of small diameter said grid not being necessary in case of larger dishes.

In practical use, when the assembled garbage receptacle and pan are seated in the sink with or without the dish rack, vegetable parings and other refuse may be deposited in the garbage receptacle, and when it is desired to cleanse dishes, the dish rack will be applied and the dirty dishes may be drenched with a hose 17 provided with a spraying device, as a nozzle 18, and connected with the hot water faucet 19, thus washing the refuse from the dishes down into the garbage receptacle from which the water will flow down through the perforated bottom and out through the lateral perforations 5 and thence up and out over the top of the pan 1. It is obvious that the drenching may be done by other means than the hose, as by pouring water from a kettle or other receptacle.

The perforated bottom 7 is preferably elevated being supported above the lower end of the garbage receptacle wall 4, so that there is a practical drainage space below the perforated bottom 7; and the rim of the pan extends above the level of the lateral perforations 5, so that the garbage receptacle is provided with a practical grease trap. Grease washed from the dishes will not pass down through the water contained in the trap, and when the trap becomes filled with water above the level of the perforated floor 7, such grease will not find its way to the floor, but will solidify on the top of the water or on the refuse or the garbage contained above the perforated bottom.

When the dishes have been cleansed, the rack may be removed and the garbage receptacle and pan may be tilted to drain out of the pan all or the greater portion of the water contained therein, thus to prevent liquid dripping from the receptacle when the same is being carried out; or if desired, the receptacle may be detached from the pan and set inside in the sink to drain, after which the receptacle may be carried out and the garbage disposed of. The several detachable members 1, 4, 7 and 14, may be easily washed when separated and the whole kept in a perfectly clean and sanitary condition. It is thus seen that the labor of washing dishes may be greatly reduced by drenching the dishes with hot water and at the same time the waste pipe of the sink is protected from accumulations of grease and solid materials which might otherwise occur therein.

While I have shown a perforated bottom 7, and perforations 5 forming the lateral outlet from the receptacle below said bottom, it is understood that it is necessary to make suitable provision for escape of the water from the interior of the garbage receptacle above the bottom into the pan and from the receptacle to the portion of the pan outside said receptacle, and that this may be accomplished by various means, as by looseness of the joints between the bottom 7 and the wall 4, and between the wall 4 and the pan 1 upon which the wall rests.

I claim:

1. A utensil for kitchen use comprising a garbage receptacle having an elevated perforated bottom and an outlet below such bottom, a pan forming a trap for the lower end of the garbage receptacle, the top of the pan being above the level of said perforated bottom, said garbage receptacle having a smooth reinforced upper edge to receive a dish rack.

2. A garbage receptacle provided with an elevated perforated floor, a lateral outlet below the floor, and a pan to receive and form a grease trap for the lower end of said receptacle the top of said pan being above the level of the perforated floor.

3. A garbage receptacle provided with an elevated perforated floor, an outlet below the floor, supporting means on the outside near the lower edge of said receptacle, and a pan detachably secured to said supporting means, said pan forming a grease trap for the lower end of said receptacle, the top of said pan being above the level of the perforated floor.

4. A garbage receptacle comprising a wall which is open at top and bottom, a pan inside which said wall is seated, means inside the wall to support a bottom, and a detachable bottom supported by said means below the level of the top of the pan.

5. A portable garbage and grease separator comprising a pan, a receptacle seated therein, and a detachable perforated bottom supported in the receptacle below the level of the top of the pan and above the floor thereof.

6. A garbage receptacle comprising a wall open at the top and bottom only, lugs fixed to the inside of the wall, a perforated bottom detachably supported by said lugs, and a pan in which said receptacle is seated, the upper edge of said pan extending above the level of said perforated bottom.

7. A garbage receptacle comprising a wall open at the top and bottom only, supporting means secured to both the inside and outside of said wall, a perforated bottom detachably supported on the supporting means secured inside of said wall, and a pan detachably fastened to the lower end of said wall, being fastened to the supporting means secured outside of said wall, the perforated bottom being elevated above the floor of the pan and below the upper edge of the pan, the whole arrangement being portable for carrying out the garbage.

8. A garbage receptacle comprising a wall open at the top and bottom only, means inside the wall to support a bottom, and a detachable perforated bottom supported by said means, said receptacle being seated in and attached to a pan which raises the water above the perforated bottom, the whole being portable for carrying out the garbage.

In testimony whereof, I have hereunto set my hand at Los Angeles, California, this 6th day of December, 1912.

GEORGE H. BARKER.

In presence of—
　JAMES R. TOWNSEND,
　L. BELLE RICE.

Copies of this patent may be obtained for five cents each, by addressing the "Commissioner of Patents, Washington, D. C."